United States Patent
Niemann

Patent Number: 5,796,333
Date of Patent: Aug. 18, 1998

[54] EARLY WARNING SIGNAL SYSTEM

[76] Inventor: Ralph E. Niemann, 7419 Richardson Rd., Groveport, Ohio 43125

[21] Appl. No.: 853,361

[22] Filed: May 8, 1997

[51] Int. Cl.⁶ .................................................... B60Q 1/50
[52] U.S. Cl. .................... 340/467; 340/479; 307/10.8; 315/77; 180/282; 200/61.45 R; 200/61.89
[58] Field of Search .................... 340/463, 467 R, 340/464, 468, 471, 472, 479, 478; 307/10.1, 10.8, 9.1; 315/77, 80; 701/1; 200/61.89, 61.45 R; 180/271, 282

[56] References Cited

U.S. PATENT DOCUMENTS

| | | | |
|---|---|---|---|
| D. 343,017 | 1/1994 | Montgomery, II et al. | D26/35 |
| 3,638,181 | 1/1972 | Bryant | 340/467 |
| 4,173,012 | 10/1979 | Burger | 340/467 |
| 4,280,116 | 7/1981 | Camp | 340/467 |
| 4,470,036 | 9/1984 | Doerr et al. | 340/467 |
| 4,730,181 | 3/1988 | Perkins | 340/467 |
| 4,924,207 | 5/1990 | Lariscy | 340/467 |
| 5,089,805 | 2/1992 | Salsman | 340/467 |

*Primary Examiner*—Nina Tong

[57] ABSTRACT

A new Early Warning Signal System for producing a warning to a following driver of a speed reduction and possible braking. The inventive device includes a warning signal light powered by the vehicle power supply, and a control circuit including a switch actuated by an actuating linkage connected to an inlet valve of the carburetor and a flashing device, for controlling operation of the warning light. The flashing device periodically interrupts the current so that the warning light flashes.

4 Claims, 2 Drawing Sheets

EARLY WARNING SIGNAL SYSTEM

BACKGROUND OF THE INVENTION

1. Field of the Invention

The present invention relates to vehicle signaling systems and more particularly pertains to a new Early Warning Signal System for producing a warning to a following driver of a speed reduction and possible braking.

2. Description of the Prior Art

The use of vehicle signaling systems is known in the prior art. More specifically, vehicle signaling systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle signaling systems include U.S. Pat. No. 4,924,207; U.S. Pat. No. 4,730,181; U.S. Pat. No. Des. 343,017; U.S. Pat. No. 5,089,805; U.S. Pat. No. 4,470,036 and U.S. Pat. No. 4,280,116.

While these devices fulfill their respective, particular objectives and requirements, the aforementioned patents do not disclose a new Early Warning Signal System. The inventive device includes a warning signal light disposed in the rear of the vehicle and powered by the vehicle power supply, and a control circuit including a switch actuated by a linkage extending from an inlet valve of a carburetor and a flashing device, for controlling operation of the warning light. The flashing device periodically interrupts the current so that the warning light flashes.

In these respects, the Early Warning Signal System according to the present invention substantially departs from the conventional concepts and designs of the prior art, and in so doing provides an apparatus primarily developed for the purpose of producing a warning to a following driver of a speed reduction and possible braking.

SUMMARY OF THE INVENTION

In view of the foregoing disadvantages inherent in the known types of vehicle signaling systems now present in the prior art, the present invention provides a new Early Warning Signal System construction wherein the same can be utilized for producing a warning to a following driver of a speed reduction and possible braking.

The general purpose of the present invention, which will be described subsequently in greater detail, is to provide a new Early Warning Signal System apparatus and method which has many of the advantages of the vehicle signaling systems mentioned heretofore and many novel features that result in a new Early Warning Signal System which is not anticipated, rendered obvious, suggested, or even implied by any of the prior art vehicle signaling systems, either alone or in any combination thereof.

To attain this, the present invention generally comprises a warning signal light powered by the vehicle power supply, and a control circuit including a switch actuated by an actuating linkage connected to a carburetor inlet valve and a flashing device, for controlling operation of the warning light. The flashing device periodically interrupts the current so that the warning light flashes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Early Warning Signal System apparatus and method which has many of the advantages of the vehicle signaling systems mentioned heretofore and many novel features that result in a new Early Warning Signal System which is not anticipated, rendered obvious, suggested, or even implied by any of the prior art vehicle signaling systems, either alone or in any combination thereof.

It is another object of the present invention to provide a new Early Warning Signal System which may be easily and efficiently manufactured and marketed.

It is a further object of the present invention to provide a new Early Warning Signal System which is of a durable and reliable construction.

An even further object of the present invention is to provide a new Early Warning Signal System which is susceptible of a low cost of manufacture with regard to both materials and labor, and which accordingly is then susceptible of low prices of sale to the consuming public, thereby making such Early Warning Signal System economically available to the buying public.

Still yet another object of the present invention is to provide a new Early Warning Signal System which provides in the apparatuses and methods of the prior art some of the advantages thereof, while simultaneously overcoming some of the disadvantages normally associated therewith.

Still another object of the present invention is to provide a new Early Warning Signal System for producing a warning to a following driver of a speed reduction and possible braking.

Yet another object of the present invention is to provide a new Early Warning Signal System which includes a warning signal light powered by the vehicle power supply, and a control circuit including a switch actuated by an actuating linkage connected to a carburetor inlet valve and a flashing device, for controlling operation of the warning light. The flashing device periodically interrupts the current so that the warning light flashes.

Still yet another object of the present invention is to provide a new Early Warning Signal System that indicates a deceleration without the brakes being used.

Even still another object of the present invention is to provide a new Early Warning Signal System that can be easily installed onto existing vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
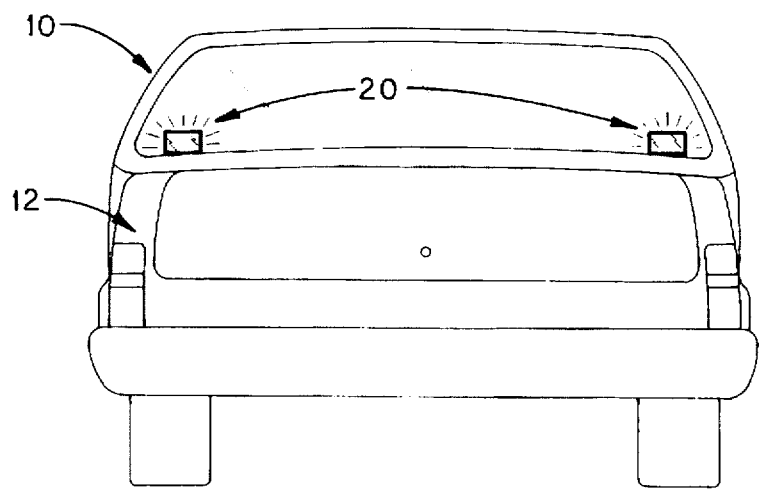
FIG. 1 is a rear view of a vehicle with warning light units installed in the rear of the vehicle.
Figure 2A:
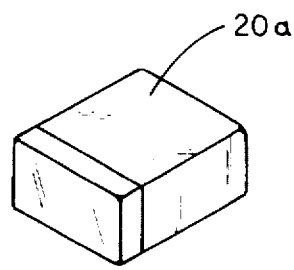
FIGS. 2A–2C shows different embodiments of the warning light units.
Figure 2B:
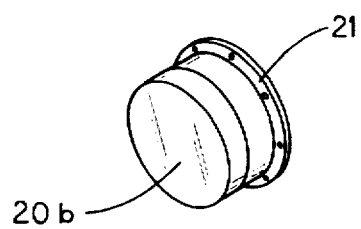
Figure 2C:
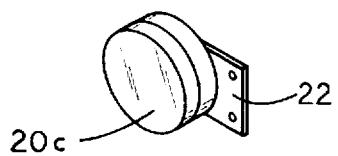

With reference now to the drawings, and in particular to FIGS. 1 through 4 thereof, a new Early Warning Signal System embodying the principles and concepts of the present invention and generally designated by the reference numeral 10 will be described.

More specifically, it will be noted that the Early Warning Signal System 10 comprises warning light units 20 powered by the vehicle power supply 50, and a control circuit 30 which operates based upon the position of accelerator pedal 40.

As best illustrated in FIGS. 1 through 4, it can be shown that the warning light units 20 are mounted at the rear of the vehicle 12 in a location such that the lights can be easily seen by a following motorist when illuminated. The units 20 can be installed inside of a vehicles interior near the rear window, such as in a passenger car, or the units 20 can be installed on the exterior of the vehicle at the rear of the vehicle, such as when the vehicle is a truck, recreational vehicle, or bus, or when the vehicle includes a trailer, such as a car pulling a boat on a trailer. As illustrated in FIGS. 2A–C, the light units can have various configurations depending upon their use. FIG. 2A shows a unit 20a which can be used on the inside of passenger vehicles. Such a unit can simply rest on the rear window ledge inside of the vehicle. FIG. 2B shows a unit 20b for use with vehicles having substantially flat rear surfaces, such as trucks, RV's, and buses. This unit would include a circular mounting flange 21 for securing the unit to the vehicle. FIG. 2C shows a unit 20c which can be used with trailers, such as a boat trailer. This unit includes a side mounting flange 22 for securing the unit to the trailer. The light units can produce any noticeable color, such as red or yellow.

Figure 4:
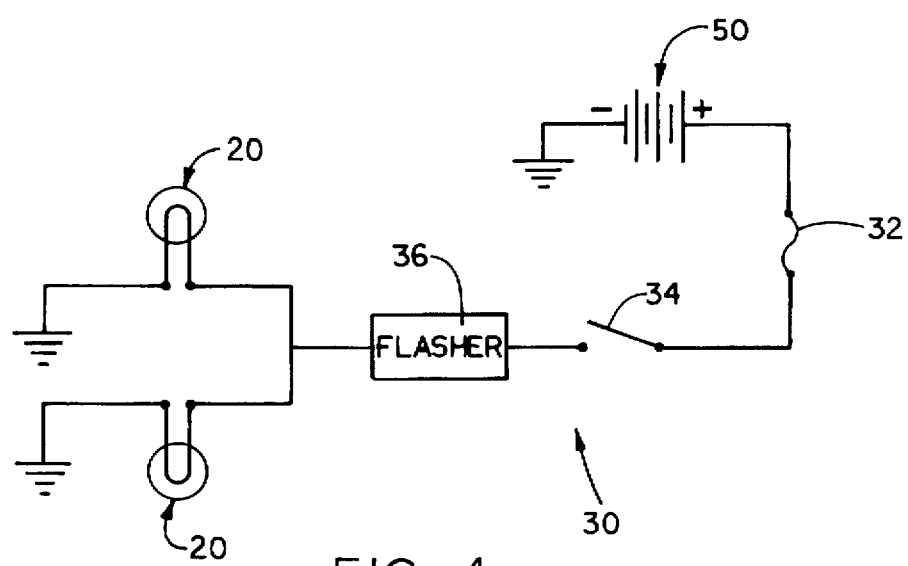
FIG. 4 is an electrical schematic of the system.

The light units are powered by the vehicles power supply 50, such as a car battery. The flow of electrical current from the power supply 50 to the light units 20 is controlled by a control circuit 30. As seen in FIG. 4, the control circuit includes a fuse 32, an accelerator switch 34, and a flasher device 36. The fuse is disposed for selectively engaging/ disengaging the system by adding/removing the fuse. The switch 34, for instance, can be a single pole, single throw switch. The switch 34 has two states, either opened or closed, which are controlled by the position of a linkage extending from a carburetor inlet valve. Flasher device 36 is a standard electrical device known to those having ordinary skill in the art for producing periodic current flows to the light units, causing the light units to flash. Note that the use of flashing lights is important, as a flashing light draws more attention, and is thus more "visible", than a steady, non-flashing light.

Figure 3:
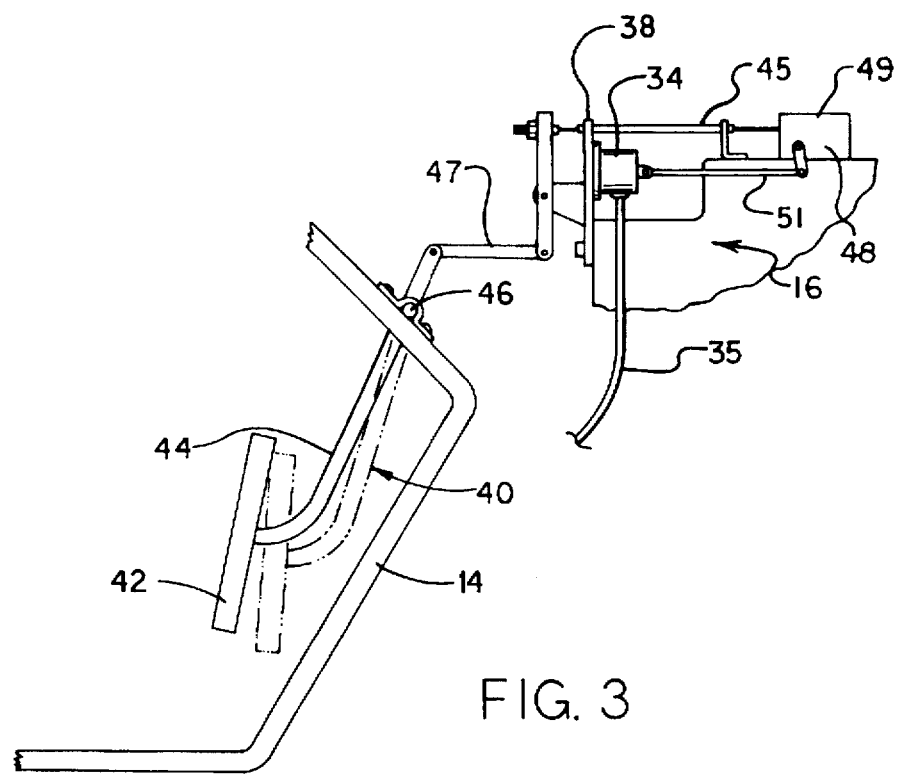
FIG. 3 is a view of the accelerator linkage and the switch actuated by movements of an actuating linkage extending from a carburetor inlet valve.

As seen in FIG. 3, the accelerator switch 34 is mounted in a stationary manner to stationary structure 16 within the vehicle's engine compartment by a mounting bracket 38. The stationary structure 16 can, for instance, be the housing of the carburetor. The switch can be any type of switch which is able to be opened and closed in response to movements of the pedal. For instance, the switch can be of the spring biased plunger type, as disclosed in U. S. Pat. No. 4,924,207. Cable 35 leads to the switch 34 and contains wiring leading from the fuse and battery and wiring leading to the flasher 36 and light units 20. The accelerator pedal 40 itself includes a foot pad 42 attached to an arm 44 which is pivotally attached to an interior vehicle panel 14 by a pivot 46. An accelerator linkage 45 is connected to one end of the arm 44 by an L-shaped linkage 47, with the linkage 47 itself being pivotally mounted to the bracket 38. The linkage 45 is preferably comprised of a cable disposed inside of a sleeve, although other linkages can be used as well. The opposite end (not shown) of the accelerator linkage connects with an inlet valve 49 which controls the flow of fuel into the carburetor. The valve 49 includes an actuating linkage 51 extending therefrom which follows the movements of inlet valve 49. An actuating arm 48 is secured to the end of the linkage 51, adjacent the inlet valve 49, such that the arm 48 moves in unison with the linkage 51. Thus it should be clear that when the pedal 40 is depressed (dashed lines in FIG. 3), the accelerator linkage 45 moves to the right, which causes the valve 49 to open, thus causing the linkage 51 to move to the right, with the arm 48 moving away from the switch 34 which is thus opened preventing current flow to the lights. However, upon pedal release (full lines in FIG. 3), the accelerator linkage moves to the left, which closes the valve, which moves the actuating linkage to the left so that the arm engages with the switch which is thus closed, permitting current flow to the lights.

In use, with no pressure applied to the accelerator pedal, i.e. released, the arm 48 actuates the switch 34 to the closed position, thus permitting current flow to the light units 20. The flasher 36 periodically supplies current to the light units, causing the light units to flash. Since the accelerator pedal is released, vehicle deceleration will occur since gas is not being supplied to the engine. When the driver wishes to accelerate, the pedal is depressed, which opens the switch and interrupts the current flow, so that the light units are not illuminated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A deceleration signal system for a vehicle having an accelerator pedal, and a vehicle power supply, comprising:

an accelerator linkage coupled at one end to the accelerator pedal by an L-shaped linkage and connected at another end to an inlet valve of a carburetor;

at least one warning light unit installed at the rear of the vehicle, said warning light unit being powered by the vehicle power supply;

a control circuit between the warning light unit and the power supply for controlling supply of power to, and operation of, the warning light unit;

an actuating arm fastened at one end to an end of an actuating linkage and fastened at another end to the inlet valve to engage and move the actuating linkage; wherein another end of the actuating linkage connected to an accelerator switch;

said control circuit including the accelerator switch having opened and closed states;

said switch being opened and closed by movement of the actuating linkage and the actuating arm;

said actuating arm being connected to the inlet valve of the carburetor, such that when the accelerator pedal is depressed, the accelerator linkage opens the inlet valve, which actuates the actuating arm moving the actuating linkage to a first direction, and the switch is opened, and when the accelerator pedal is released, the accelerator linkage closes the inlet valve, which actuates the actuating arm moving the actuating linkage to the opposite direction of said first direction, and the switch is closed; and a flasher device in the circuit between the switch and the warning light unit to cause periodic interruptions in the current in the circuit therefore causing the warning light unit to flash when the switch is closed.

2. The deceleration signal system of claim 1, wherein there are a plurality of said warning light units.

3. The deceleration signal system of claim 1, wherein the warning light unit is installed inside of the vehicle.

4. The deceleration signal system of claim 1, wherein the warning light unit is installed outside of the vehicle.

* * * * *